United States Patent [19]

Chung et al.

[11] Patent Number: 5,057,558

[45] Date of Patent: Oct. 15, 1991

[54] POLYOL EXTENDED CATHODIC ELECTRODEPOSITION RESINS

[75] Inventors: Ding Y. Chung, Rochester Hills; Tapan K. Debroy, Shelby Township, both of

[73] Assignee: E. I. Du Pont de Nemours and Company, Wilmington, Del.

[21] Appl. No.: 618,401

[22] Filed: Nov. 27, 1990

[51] Int. Cl.$^5$ .............................................. C08K 63/00
[52] U.S. Cl. .................................. 523/414; 523/415; 528/110
[58] Field of Search ................. 528/110; 523/414, 415

[56] References Cited

U.S. PATENT DOCUMENTS

| | | | |
|---|---|---|---|
| 4,104,147 | 8/1978 | Marchetti et al. | 204/181 C |
| 4,419,467 | 12/1983 | Wismer et al. | 260/561 |
| 4,868,230 | 9/1989 | Rao et al. | 523/414 |

Primary Examiner—Paul R. Michl
Assistant Examiner—Christopher P. Rogers
Attorney, Agent, or Firm—Hilmar L. Fricke

[57] ABSTRACT

An improved electrodepositable cationic resin is disclosed. Prior art electrodepositable cationic resins are formed from polyepoxides which are chain extended with polyether or polyester polyols to internally flexibilize the resin. The polyepoxide resin of the invention is chain extended with a monoepoxide-triol adduct which provides a resin with improved throw power and improved flow while maintaining other important characteristics of the resin.

9 Claims, No Drawings

POLYOL EXTENDED CATHODIC ELECTRODEPOSITION RESINS

BACKGROUND OF THE INVENTION

This invention is directed is to an electrodepositable epoxy resin and in particular to an epoxy resin that is chain extended with a polyol and is blended with crosslinking agents for use in cathodic electrocoat processes.

The coating of electrically conductive substrates by an electrodeposition process (also called an electrocoating process) is a well known and important industrial process. Electrodeposition of primers to automotive substrates is widely used in the automotive industry. In this process, a conductive article such as an autobody or an autopart is immersed in bath of a coating composition of an aqueous emulsion of film-forming polymer and acts as an electrode in the electrodeposition process. An electric current is passed between the article and a counter-electrode in electrical contact with the aqueous emulsion, until a desired thickness of coating is deposited on the article. In a cathodic electrocoating process, the article to be coated is the cathode and the counter-electrode is the anode.

Resin compositions used in the bath of a typical cathodic electrocoating process are also well known in the art. These resins are typically made from polyepoxide resins which have been chain extended and then an adduct is formed to include amines groups in the resin. Amine groups are typically introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrocoating bath. The thickness of the coating deposited on the article is a function of the bath characteristics, the electrical operating characteristics, the immersion time, and the like.

The coated article is removed from the bath after a certain period of time. The article is rinsed with deionized water and the coating is cured typically in an oven at sufficient temperature to produce a crosslinked coating.

Cathodic electrodepositable resin compositions, coating baths, and cathodic electrodeposition processes are disclosed in U.S. Pat. Nos. 3,922,253; 3,984,299; 4,093,594; 4,134,864; 4,137,140; 4,419,467; and 4,468,307, the disclosures of which are incorporated by reference.

An important characteristic of the electrocoating bath is its throw power. Throw power concerns the ability of the resin to coat the recessed areas and shielded portions of the cathode which is the article being coated. A second important characteristic of the final coating is the flexibility of the cured coating. This has become increasingly important to automobile manufacturers as cars have become more aerodynamic in shape and therefore require a coating with improved flexibility. What is needed is an electrocoating composition which has increased throw power and provides a coating that has improved flexibility.

SUMMARY OF THE INVENTION

An electrodepositable resin used in an cathodic electrocoating composition of an aromatic polyepoxide resin that has been flexiblized by reacting the aromatic polyepoxide with a monoepoxide-triol adduct; the resin provides improved throw power to an electrocoating bath and provides the resulting deposited cured film with improved flexibilty without adversely affecting other important characteristics of the resin.

DETAILED DESCRIPTION OF THE INVENTION

Most principal emulsions used in an electrocoating composition comprise an epoxy-amine adduct blended with a crosslinking agent and neutralized with an acid to form a water soluble product.

The polyepoxide resins used in this invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are
2,2-bis-(4-hydroxy-3-tertiarybutylphenyl)-propane,
1,1-bis-(4-hydroxyphenyl)ethane,
2-methyl-1,1-bis-(4-hydroxyphenyl) propane,
2,2-bis-(4-hydroxy-3-tertiarybutylphenyl)propane,
bis-(2-hydroxynaphthyl)methane,
1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-cyclohexanediol, 1,4-cyclohexanediol, 1,2-bis(hydroxymethyl)cyclohexane, 1,3-bis-(hydroxymethyl)cyclohexane and hydrogenated bisphenol A.

The polyepoxides have weight average molecular weights of at least 200 and preferably within the range of 200 to 2000, and more preferably about 340 to 2000.

Molecular weights are determined by gel permeation chromatography using polystyrene as standard.

To be useful in an electrocoating composition, the polyepoxide is chain extended to provide flexibility to the composition being electrodeposited. The chain extended polyepoxide enhances flow and coalescence and increases rupture voltage of the composition. Conventionally, the polyepoxide is chain extended with a polyether diol or a polyester diol.

It has been found that by substituting a polyol of a monoepoxide-triol adduct for the polyether diol or polyester diol in chain extending the polyepoxide, the throw power of the electrocoating bath and the flow and flexiblilty of electrodeposited composition are improved.

The polyol of a monoepoxide-triol adduct is the reaction product of a monoepoxide and a triol. Typically, a reaction temperature of about 120–200° C. is used and the components of the reaction product are reacted for about 3–12 hours. A catalyst such as a tertiary amine e.g. dimethylbenzyl amine is used to form the polyol.

Typically useful monoepoxides are alkyl glycidyl epoxides having 4–18 carbon atoms in the alkyl group such as butyl glycidyl ether. Preferred monoepoxides are "Araldite" DY025 (Ciba-Geigy) where the alkyl group contains 12 and 14 carbon atoms and "Araldite DY027 (Ciba-Geigy) where the alkyl group contains 8 and 10 carbon atoms. Other useful monoepoxides are alkyl glycidyl esters, such as "Cardura" E 10 which is the glycidyl ester of valeric acid.

Typically useful triols are trimethylol alkanes. Preferred are trimethylol propane (TMP) and trimethylol ethane. The preferred molar ratio of monepoxide to triol is about 1:1 to 1:3.

In the chain extension of the polepoxide with the monepoxide-triol adduct, the hydroxy groups of the adduct react with the epoxide groups of the polyepoxide. Surprisingly, that even though the monepoxide -triol adduct contains trifunctional primary hydroxyl groups, the chain extended polyepoxide is not unusually high in viscosity nor is a gelled product formed.

The chain extended polyepoxide is then reacted with an amine to form an adduct that contains nitrogen The amines used to form this adduct are monoamines, particularly secondary amines with primary hydroxyl groups. When a secondary amine containing a primary hydroxyl group is reacted with the terminal epoxide group of the chain extended polyepoxide, the result is the amine epoxy adduct in which the amine has become tertiary and contains a primary hydroxyl group. Typical amines that can be used are methyl ethanol amine, diethanolamine, and the like. The preferred amine is methyl ethanol amine.

Mixtures of the various amines described above can be used. The reaction of the secondary amine with the polyepoxide resin takes place upon mixing the amine with the product. The reaction can be conducted neat, or, optionally in the presence of suitable solvent. The reaction may be exothermic and cooling may be desired. However, heating to a moderate temperature, that is, within the range of 50 to 150° C, may be used to hasten the reaction.

The adduct of the chain extended polyepoxide and the amine attains its cationic character, i.e., cationic groups are formed, by at least partial neutralization with an acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the adduct in water. Typically, the amount of acid used will be sufficient to provide at least 30 percent of the total theoretical neutralization. Excess acid beyond that required for 100 percent total theoretical neutralization can also be used.

The extent of cationic group formation of the adduct should be selected such that when the resin is mixed with aqueous medium, a stable dispersion will form. A stable dispersion is one which does not settle or is one which is easily redispersible if some sedimentation occurs. In addition, the dispersion should contain sufficient cationic groups that the dispersed resin particles will migrate towards the cathode in an electrocoating process when there is an electrical potential between the anode and cathode immersed in the aqueous dispersion or electrocoating bath.

In general, most of the cationic adducts prepared by the process of the invention contain from about 40 to 80, preferably from about 50 to 70 milliequivalents of a cationic group per hundred grams of solids.

The cationic adduct binder should preferably have a weight average molecular weight, as determined by gel permeation chromatography using a polystyrene standard, of about 500–10,000, more preferably less than 5,000 and most preferably less than 3,000 in order to achieve a high level of flow after application.

The above described cationic adduct is mixed with a crosslinking agent which are well known in the art. Typically useful crosslinkers are aliphatic and aromatic isocyanates such as hexamethylene diisocyanate, toluene diisocyanate, methylene diphenyl diisocyanate and the like. These isocyanates can also be reacted with a polyol such as trimethylolpropane to form a polyisocyanate. The isocyanate is then pre-reacted with a blocking agent such as methyl ethyl ketoxime or ethylene glycol mono butyl ether to block the isocyanate functionality (i.e., the crosslinking functionality). Upon heating the blocking agent separates and crosslinking occurs with the above described adduct. The preferred crosslinking agent for this invention is toluene diisocyanate (TDI) reacted with trimethylol propane (TMP) and blocked with ethylene glycol mono butyl ether.

The ratio of TDI to TMP is about 3:1. The ethylene glycol mono butyl ether is usually added in an equivalent ratio of about 1:1 to the TDI/TMP polyisocyanate. Reaction conditions for the above reactions are well known in the art and are disclosed in the following patents. U.S. Pat. Nos. 4,031,050 and 3,947,358.

The above described cationic adduct and the blocked isocyanate are the principal film forming resinous ingredients in the electrocoating composition and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants and defoamers. Pigment grinding vehicles are well known in the art. After grinding, the particle size of the pigment should be as small as practical; generally, the particle size is about 6–8 using a Hegman grinding gauge.

Pigments which can be used in the practice of this invention include titanium dioxide, basic lead silicate, strontium chromate, carbon black, iron oxide, clay and the like. Pigments with high surface areas and oil absorbencies should be used judiciously because they can have an undesirable effect on coalescence and flow.

The pigment-to-resin weight ratio is also important and should be preferably less than 0.5:1, more preferably less than 0.4:1, and usually about 0.2 to 0.4:1. Higher pigment-to-resin solids weight ratios also have been found to adversely affect coalescence and flow.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C," These optional ingredients, when present, constitute from about 0.1 to 20 percent by weight of resin solids. Plasticizers are optional ingredients because they promote flow. Examples are high boiling water immiscible materials such as ethylene or propylene oxide adducts of nonyl phenols or bisphenol A. Plasticizers are usually used in amounts of about 0.1 to 15 percent by weight resin solids.

Curing catalysts such as tin catalysts are usually present in the composition. Examples are dibutyl tin dilaurate and dibutyl tin oxide. When used, they are typically present in amounts of about 0.05 to 1 percent by weight of tin, based on weight of total resin solids.

The electrocoating composition of this invention is a dispersion of a resinous or film forming components such as the epoxy adduct and the crosslinking agent in aqueous medium. The term "dispersion" as used herein is believed to be a two-phase translucent or opaque aqueous resinous system in which the resin is in the dispersed phase and an aqueous is the continuous phase. The average particle size diameter of the resinous phase is about 0.1 to 10 microns preferably less than 5 microns. The concentration of the resinous products in the aqueous medium is, in general, not critical. The aqueous dispersion usually contains from about 3 to 50 percent, typically, 5 to 40 percent by weight resin solids. Fully diluted electrocoating baths of an electrodeposition process generally have solids contents of about 3 to 25 percent by weight.

The major portion of the aqueous medium is water. Besides water, the aqueous medium may also contain coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on weight of resin solids.

The following examples illustrate the invention. All parts and percentages are on a weight basis unless otherwise noted. Molecular weights are determined by gel permeation chromatography using polystyrene as the standard.

EXAMPLE I

Preparation of Polyol of Monoepoxide-triol Adduct

The following constituents were added to a reactor equipped with a stirrer and a heating source: 292.5 parts of "Araldite" DY025 (an alkyl glycidyl ether where the alkyl groups have 12 and 14 carbon atoms having WPE (weight per epoxide) of 292.5 from Ciba-Geigy), 223.5 parts of TMP (trimethylol propane) and 2.0 parts of dimethyl benzylamine. The constituents were heated to about 177° C. under a nitrogen atmosphere while constantly being mixed and held at this temperature until all epoxide groups had reacted.

Preparation of Chain Extended Polyepoxide

The following constituents were added to a reactor equipped as above:

| | Parts by Weight |
|---|---|
| Portion 1 | |
| "Epon 828" (epoxy resin of epichlorohydrin and Bisphenol A having an epoxy equivalent weight of 188 from Shell Chemical Company) | 684.0 |
| Polyol (prepared above) | 194.0 |
| Bisphenol A | 136.8 |
| Xylene | 50.5 |
| Portion 2 | |
| Dimethyl benzylamine | 0.6 |

| | Parts by Weight |
|---|---|
| Portion 3 | |
| Dimethyl benzylamine | 2.3 |
| Portion 4 | |
| DETA diketimine (reaction product of diethylene triamine and methyl isobutyl ketone - 72% nonvolatile) | 74.0 |
| Methyl ethanolamine | 64.0 |
| Portion 5 | |
| Methyl isobutyl ketone | 304.0 |
| Total | 1510.2 |

Portion 1 was added to the reactor and heated to about 145° C. under an atmosphere of nitrogen. Portion 2 was added and the mixture was held at 169° C. for one hour. Portion 3 was added and the mixture was held at 147° C. until a 1020 epoxy equivalent weight was obtained and the mixture was then cooled to 98° C. Portion 4 was added and the mixture was held at 120°C. for one hour and then Portion 5 was added. The resulting resin solution had a non-volatile content of 75%.

Preparation of Crosslinking Resin Solution

A blocked polyisocyanate crosslinking resin solution was prepared by charging 522.0 parts of TDI (toluene diisocyanate—"Mondur" TD 80 from Mobay Chemical Company) into a reaction vessel equipped as above. 0.15 parts of dibutyl tin dilaurate and 385.2 parts of anhydrous methyl isobutyl ketone were added under an atmosphere of nitrogen. 390.0 parts of 2-ethyl hexanol were added to the mixture while keeping the reaction mixture below 60° C. 133.8 parts of trimethylol propane were added. The resulting mixture was held at 120° C. for one hour until essentially all free isocyante was reacted. Then 63.0 parts butanol were added. The resulting mixture had a 70.0% non-volatile content.

Preparation of Quaternizing Agent

The following constituents were charged into a reaction vessel equipped as above:

| | Parts by Weight | NV* |
|---|---|---|
| 2-Ethylhexanol half capped TDI in methyl isobutyl ketone | 320.0 | 304.0 |
| Dimethylethanolamine | 87.2 | 87.2 |
| Aqueous Lactic Acid Solution | 117.6 | 88.2 |
| 2-Butoxyethanol | 39.2 | |
| Total | 564.0 | 479.4 |

*NV-Non-volatile content

The quaternizing agent was prepared by adding dimethylethanolamine to the ethylhexanol half-capped TDI in the reaction vessel at room temperature. An exothermic reaction occured and the reaction mixture was stirred for one hour at 80° C. The aqueous lactic acid solution was then added and then followed by the addition of 2-butoxyethanol. The reaction mixture was held for about one hour at 65° C. with constant stirring to form the quaternizing agent.

| Preparation of the Pigment Grinding Vehicle | Parts by Weight | NV |
|---|---|---|
| "Epon 829" | 720.0 | 682.0 |
| Bisphenol A | 289.6 | 289.6 |

| Preparation of the Pigment Grinding Vehicle | Parts by Weight | NV |
|---|---|---|
| 2-Ethylhexanol half capped TDI in methyl isobutyl ketone | 406.4 | 386.1 |
| Quaternizing Agent (prepared above) | 496.3 | 421.9 |
| Deionized Water | 71.2 | |
| 2-Butoxyethanol | 149.0 | |
| Total | 3068.3 | 1779.6 |

To form the pigment grinding vehicle, "Epon 829" (a diglycidyl ether of bisphenol A having an expoxide equivalent weight of 193-203 from Shell Chemical Co.) and Bisphenol A were charged under a nitrogen atmosphere to a reaction vessel equipped as above and heated to 150-160° C. to initiate an exothermic reaction. The exothermic reaction was continued for about 1 hour at 150-160° C. The reaction mixture was then cooled to 120° C. and the 2-ethylhexanol half-capped TDI was added. The temperature of the reaction mixture was held at 110-120° C. for one hour, followed by the addition of the 2-butoxyethanol. The reaction mixture was then cooled to 85-90° C., homogenized and then water was added followed by the addition of the quaternizing agent. The temperature of the reaction mixture was held at 80-85° C. until an acid value of about 1 was obtained. The reaction mixture had a solids content of 58 percent.

| Preparation of Emulsion | Parts by Weight | NV |
|---|---|---|
| Chain Extended Polyepoxide (prepared above) | 1073 | 805 |
| Capped Isocyanate Crosslinking Resin (prepared above) | 621 | 434 |
| "Downol PPH" from Dow Chemical Company | 8 | |
| Surfactant[1] | 20 | |
| Deionized Water | 1707 | |
| Lactic acid | 60 | |
| Total | 3489 | |

[1]Surfactant is a mixture of 120 parts "Amine C" from Ciba-Geigy, 120 parts acetylenic alcohol, commercially available as "Surfynol 104", 120 parts of 2-butyoxy ethanol and 221 parts by weight of deionized water and 19 parts glacial acetic acid.

The chain extended polyepoxide, capped isocyanate crosslinking resin, "Downol" PPh, lactic acid and surfactant were charged into a mixing vessel and thoroughly mixed together. Then deionized water was added with agitation. Agitation was continued until a majority of the ketone solvent evaporated. The dispersion had a solid content of 36%.

| Preparation of Pigment Paste | Parts by Weight |
|---|---|
| Pigment Grinding Vehicle (prepared above) | 266.62 |
| Deionized Water | 455.30 |
| Carbon Black Pigment | 25.98 |
| Aluminum Silicate Pigment | 51.85 |
| Lead Silicate Pigment | 22.24 |
| Dibutyl Tin Oxide | 16.34 |
| Titanium Dioxide Pigment | 296.23 |
| Total | 1134.56 |

The above ingredients were mixed together and ground in a sand mill to a Hegman No. 7 fineness.

| Preparation of an Electrocoating Bath | Parts by Weight |
|---|---|
| Emulsion (prepared above) | 1522 |
| Pigment Paste (prepared above) | 418 |
| Deionized Water | 1860 |
| Total | 3800 |

The electrocoating bath was prepared by blending the above ingredients. The resulting electrocating bath composition has a pH of 6.4, a bath conductivity of 1,700 micro siemans and has a throw power of about 14 ⅜ inches. Zinc phosphate coated cold roll steel panels were cathodically electrocoated in the electrocoating bath at 275 volts for 2 minutes at a bath temperature of about 28 C. The wet films were cured at 182° C for 15 minutes. The film build is about 0.92 mils and the appearance is smooth and the film provides good corrosion resistance.

We claim:

1. An improved cationic electrodeposition resin wherein the resin is made by chain extending an aromatic polyepoxide with an internal flexibilizer; wherein the improvement comprises said internal flexiblizer consisting of a monoepoxide-triol adduct.

2. The resin of claim 1 wherein said polyepoxide is a polymer containing about two epoxy groups per molecule.

3. The resin of claim 2 wherein said polyepoxide is a polyglycidyl ether of polyhydric phenol.

4. The resin of claim 1 wherein said monoepoxide-triol is the reaction product of a monoepoxide and a triol.

5. The resin of claim 4 wherein said monoepoxide is selected from the group consisting of an alkyl glycidyl ether or an alkyl glycidyl ester.

6. The resin of claim 4 wherein said triol is selected from the group consisting of trimethylol propane or trimethylol ethane.

7. The resin of claim 1 wherein the molar ratio of monoepoxide to triol is about 1:1 to 1:3.

8. The resin of claim 1 wherein the aromatic polyepoxide has at least two epoxy groups per molecule and is a polyglycidyl ether of a polyhydric phenol and the flexiblizer is the reaction product of a monoepoxide of an alkyl glycidyl ether and a triol of trimethylol propane wherein the molar ratio of monoepoxide to triol is about 1:1 to 1:3.

9. A method of coating an electrically conductive article with the resin of claim 1, comprising:
(1) mixing said resin with an amine to form a polyepoxy amine adduct;
(2) blending said adduct with an acid, crosslinker, and water to form a principal emulsion;
(3) adding more water and pigment paste to the principal emulsion thereby forming an electrocoat bath;
(4) immersing the article in the electrocoat bath; and
(5) passing a direct current through the article.

* * * * *